United States Patent [19]

Nakase et al.

[11] Patent Number: 5,902,158
[45] Date of Patent: May 11, 1999

[54] SMALL WATERCRAFT

[75] Inventors: Ryoichi Nakase; Naoki Katoh; Shigeyuki Ozawa; Masayoshi Nanami, all of Shizuoka, Japan

[73] Assignee: Yamaha Hatsudoki Kabushiki Kaisha, Japan

[21] Appl. No.: 08/777,484

[22] Filed: Dec. 30, 1996

[30] Foreign Application Priority Data

Dec. 28, 1995 [JP] Japan .................................. 7-343916

[51] Int. Cl.⁶ ............................................... B63H 21/32
[52] U.S. Cl. ............................ 440/88; 123/495; 114/270
[58] Field of Search ..................... 440/88, 89; 123/495, 123/514, 533; 141/59; 114/270

[56] References Cited

U.S. PATENT DOCUMENTS

| | | | |
|---|---|---|---|
| 5,103,793 | 4/1992 | Riese et al. | 123/516 |
| 5,146,901 | 9/1992 | Jones | 123/516 |
| 5,309,885 | 5/1994 | Rawlings et al. | 123/509 |
| 5,363,827 | 11/1994 | Siekmann | 123/509 |
| 5,368,001 | 11/1994 | Roche | 123/510 |
| 5,375,578 | 12/1994 | Kato et al. | 123/516 |
| 5,389,245 | 2/1995 | Jaeger et al. | 123/516 |
| 5,404,858 | 4/1995 | Kato | 123/516 |
| 5,482,021 | 1/1996 | Roche | 123/509 |
| 5,558,549 | 9/1996 | Nakase et al. | 440/88 |
| 5,562,509 | 10/1996 | Nakase et al. | 114/270 |

OTHER PUBLICATIONS

Carter® Fuel Pumps and Fuel Pump Assemblies Catalogue #3879, 1994, Weatherly Index No. 604, p. 214.

*Primary Examiner*—Jesus D. Sotelo
*Attorney, Agent, or Firm*—Knobbe, Martens, Olson & Bear, LLP

[57] ABSTRACT

An improved fuel delivery and injection system for a small watercraft engine reduces the heat effects within an enclosed engine compartment upon various components of the engine and upon the fuel within the fuel system. The fuel system integrates a fuel pump within a fuel tank at a location which minimizes the effects of watercraft leaning. The inlet of the fuel pump desirably corresponds, in the lateral direction, with a position of an inlet to the jet pump unit. In this position, the pump is less likely to draw air as the watercraft maneuvers. The fuel lines also are arranged within the engine to minimize the effect of engine heat produced by the exhaust system on the fuel delivery lines. The arrangement of the fuel pump and fuel delivery lines consequently improves the consistency of the fuel/air ratio within the fuel charge produced by the engine as less air and vapor delivered to the fuel injectors.

44 Claims, 14 Drawing Sheets

SMALL WATERCRAFT

BACKGROUND OF THE INVENTION

1. Field of the Invention

The present invention relates in general to watercrafts, and in particular to the adaptation of a small watercraft with an engine that includes a fuel delivery and injection system.

2. Description of Related Art

Personal watercrafts have become popular in recent years. This type of watercraft is sporting in nature; it turns swiftly, is easily maneuverable, and accelerates quickly. Personal watercraft today commonly carrier one rider and one or two passengers.

A relatively small hull of the personal watercraft defines an engine compartment below a rider's area. An internal combustion engine frequently lies within the engine compartment in front of a tunnel formed on the underside of the watercraft hull. The internal combustion engine commonly powers a jet propulsion device located within the tunnel. An impeller shaft commonly extends between the engine and the propulsion device for this purpose.

Personal watercrafts often employ an in-line, multi-cylinder, crankcase compression, two-cycle engine. The engine conventionally lies within the engine compartment with the in-line cylinders aligned along a longitudinal axis of the watercraft hull (in the bow to stern direction).

A dedicated carburetor usually supplies fuel to each cylinder of the engine. Because of the sporting nature of the watercraft and the tendency for frequent, abrupt directional changes of the watercraft when used, prior personal watercraft engine employ floatless-type carburetors. A fuel system used with the floatless-type carburetors continuously supplies fuel from a fuel tank to the carburetors while returning excess fuel to the fuel tank.

Though floatless carburetors improve fuel delivery to the engine's intake, prior fuel supply systems have not been so immune to abrupt directional changes. The fuel pick-up port in the fuel tank often is exposed to air when the watercraft leans in a turn, especially when the fuel level within the tank is low. Air in the fuel line produces a number of adverse affects. The fuel/air ratio of the charge delivered to the engine cylinders is reduced which results in poor engine performance. Air in the fuel line also can destroy the fuel pump's prime, as well as cause some fuel pumps to run hotter and damage the pump either immediately or over time (i.e., reduce the pump's durability).

Carburetored engines also tend to produce a fuel charge of a less than accurate fuel/air ratio. Consequently, engine performance is not optimized under all running conditions and greater pollutants can result.

SUMMARY OF THE INVENTION

The present watercraft includes a fuel injection engine in order to improve the accuracy of the fuel/air ratio of charge delivered to the engine cylinders, as well as reduce pollutants. The adaptation of a fuel injected engine into the small watercraft raises some formidable changes, however, such as, for example, eliminating air intake in the fuel supply system, as well as reducing the heat exposure of the fuel supply and injection system.

Thus, in accordance with one aspect of the present invention, there is provided a small watercraft having a hull defining a rider's area. The rider's area is positioned behind a bow of the hull and is sized to accommodate at least one rider. An internal combustion engine is located within the hull and drives a propulsion device that is carried by the hull. A fuel supply system includes a fuel tank that communicates with a fuel supply loop extending between the tank and the engine. A fuel pump is positioned within the fuel supply loop to circulate fuel through the supply loop and is located within the fuel tank.

Another aspect of the present invention involves a small watercraft having a hull defining a rider's area. The rider's area is positioned behind a bow of the hull and is sized to accommodate at least one rider. An internal combustion engine is located within the hull and drives a propulsion device carried by the hull. An exhaust pipe is connected to the engine. A fuel supply system includes a fuel delivery line and a fuel return line that together define a fuel loop between the engine and a fuel tank. The fuel delivery line communicates with a plurality of fuel injectors of the engine. The fuel delivery and return lines are arranged within the hull of the watercraft such that not more than one of the lines extends next to any portion of the exhaust pipe.

In accordance with an additional aspect of the present invention, a small watercraft has a hull defining a rider's area. The rider's area is located behind a bow of the hull and is sized to accommodate at least one rider. The hull has a longitudinal axis and defines an engine compartment. A fuel-injected, internal combustion, multi-cylinder engine is located within the hull engine compartment and drives a propulsion device carried by the hull. The engine has a plurality of fuel injectors to cyclically product a fuel charge within each cylinder of the engine. And a plurality of spark plugs of the engine ignite the fuel charge within the engine cylinders. An electronic control unit communicates with the fuel injectors to control injection timing and volume. The electronic control unit also operates at least one ignition coil, which is connected to at least one of the spark plugs, to control spark timing of the engine. In order to reduce interference noise, the electronic control unit is mounted to the hull at a remote location relative to the ignition coil.

BRIEF DESCRIPTION OF THE DRAWINGS

These and other features of the invention will now be described with reference to the drawings of preferred embodiments which are intended to illustrate and not to limit the invention, and in which.

DETAILED DESCRIPTION OF PREFERRED EMBODIMENTS OF THE INVENTION

Figure 1:
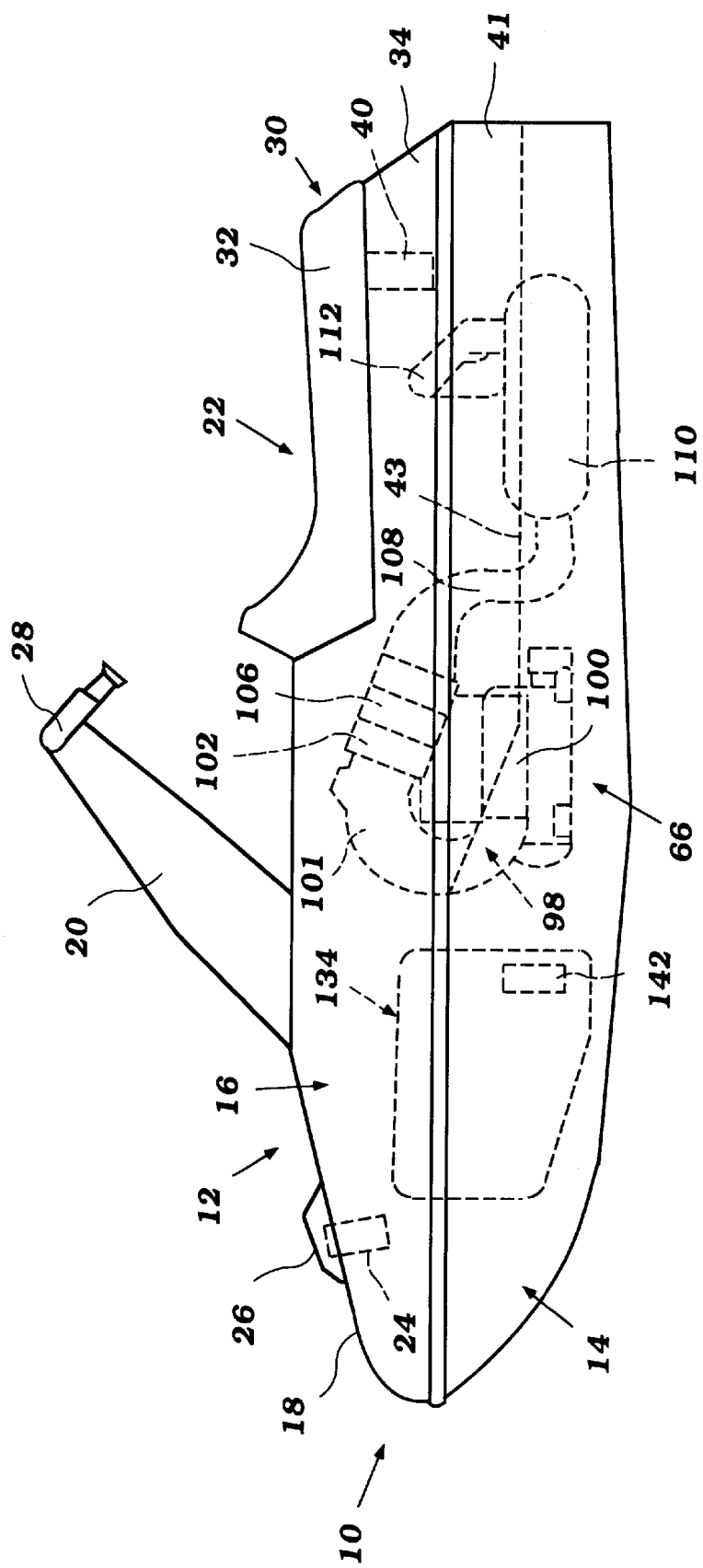
FIG. 1 is a side elevational view of a personal watercraft configured in accordance with a preferred embodiment of the present invention.

FIGS. 1 through 8 illustrate a personal watercraft 10 which includes a fuel supply system configured and arranged in accordance with a preferred embodiment of the present invention. Although the present fuel supply system is illustrated in connection with an engine for a personal watercraft, the fuel supply system can be used with other types of watercraft as well, such as, for example, but without limitation, small jet boats and the like.

Before describing the fuel supply system, an exemplary personal watercraft 10 will first be described in general details to assist the reader's understanding of the environment of use, the preferred arrangement of the fuel supply system within the watercraft 10, and the operation of the fuel supply system. The watercraft 10 includes a hull 12 formed by a lower hull section 14 and an upper deck section 16. The hull sections 14, 16 are formed from a suitable material such as, for example, a molded fiberglass reinforced resin. The lower hull section 14 and the upper deck section 16 are fixed to each other around the peripheral edges in any suitable manner.

As viewed in the direction from the bow to the stern of the watercraft, the upper deck section 16 includes a bow portion 18, a control mast 20 and a rider's area 22. The bow portion 18 slopes upwardly toward the control mast 20 and includes at least one air duct 24 through which air can enter the hull. A cover 26 extends above an upper end of the air duct 24 to inhibit an influx of water into the hull.

The control mast 20 extends upward from the bow portion 18 and supports a handlebar assembly 28. The handlebar 28 controls the steering of the watercraft 10 in a conventional manner. The handlebar assembly 28 also carries a variety of controls of the watercraft 10, such as, for example, a throttle control, a start switch and a lanyard switch.

Figure 2:
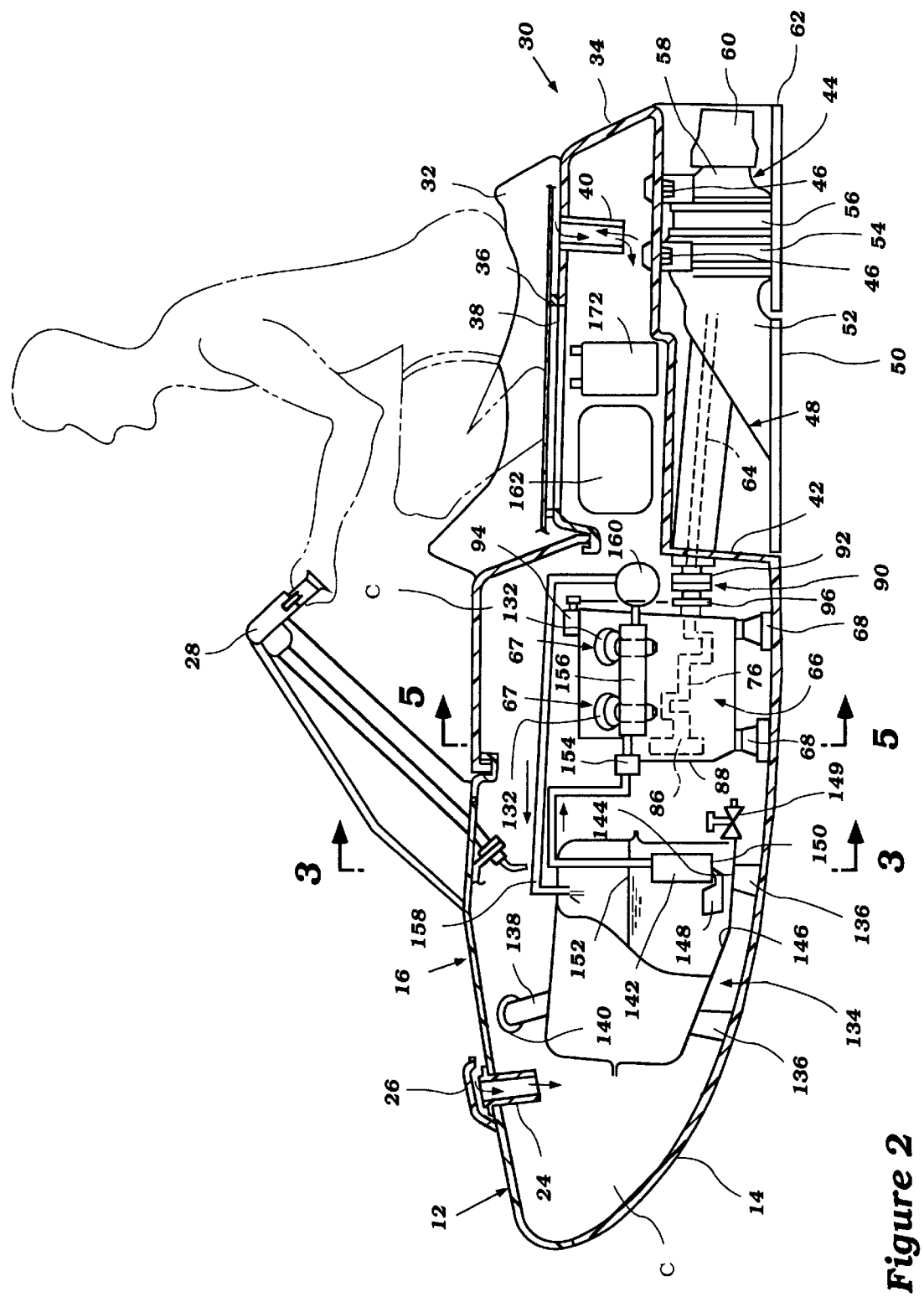
FIG. 2 is a partial side sectional view of the personal watercraft of FIG. 1 illustrating an engine with a fuel supply and injection system.

The rider's area 22 lies behind the control mast 20 and includes a seat assembly 30. In the illustrated embodiment, as best seen in FIGS. 1 and 2, the seat assembly 30 has a longitudinally extending straddle-type shape which may be straddled by an operator and by at least one or two passengers. The seat assembly 30, at least in principal part, is formed by a seat cushion 32 supported by a raised pedestal 34. The raised pedestal 34 has an elongated shape and extends longitudinally along the center of the watercraft 10. The seat cushion 32 desirably is removably attached to a top surface 36 of the pedestal 34 and covers the entire upper end of the pedestal for rider and passenger comfort.

An access opening 38 is located on an upper surface 36 of the pedestal 34. The access opening 38 opens into an engine compartment formed within the hull. The seat cushion 32 normally covers and seals closed the access opening 38. When the seat cushion 32 is removed, the engine compartment is accessible through the access opening 38.

The pedestal 34 also includes a rear air duct 40 located behind the access opening 38. The air duct 40 communicates with the atmosphere through a space S between the pedestal 34 and the cushion 32 which is formed behind the access opening 38. Air passes through the rear duct 40 in both directions, as schematically illustrated in FIG. 2.

Figure 5:
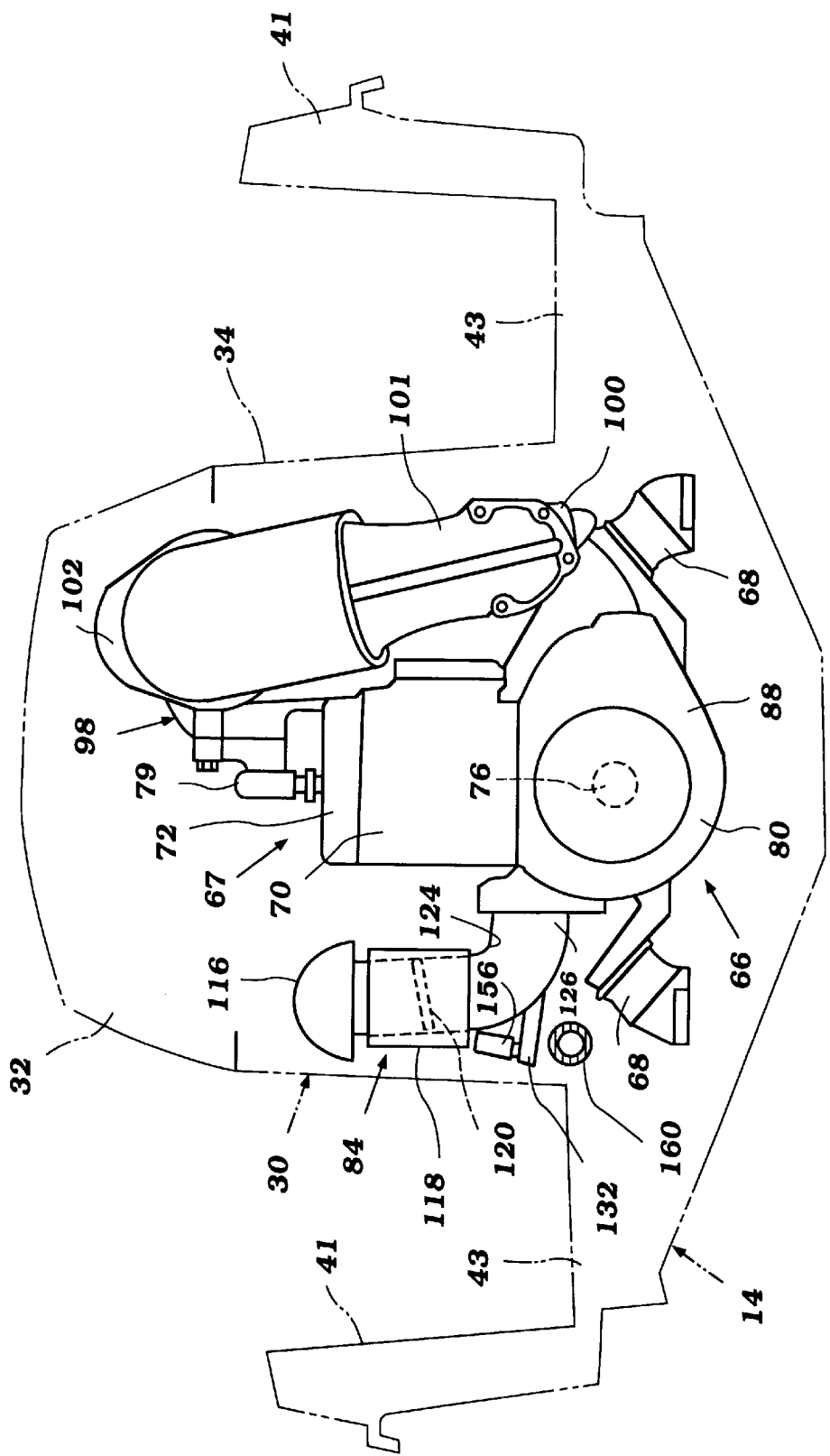
FIG. 5 is a sectional top plan view of the watercraft of FIG. 2 illustrating the arrangement of the watercraft's components within a hull of the watercraft.

As seen in FIG. 5, the upper deck section 16 of the hull 12 advantageously includes a pair of raised gunnels 41 positioned on opposite sides of the aft end of the upper deck assembly 16. The raised gunnels 41 define a pair of foot areas 43 that extend generally longitudinally and parallel to the sides of the pedestal 34. In this position, the operator and any passengers sitting on the seat assembly 30 can place their feet in the foot areas 43 with the raised gunnels 41 shielding the feet and lower legs of the riders. A non-slip (e.g., rubber) mat desirably covers the foot areas to provide increased grip and traction for the operator and the passengers.

The lower hull portion 14 principally defines the engine compartment C. Except for the air ducts 24, 40, the engine compartment C is normally substantially sealed so as to enclose an engine and the fuel system of the watercraft 10 from the body of water in which the watercraft is operated.

Figure 3:
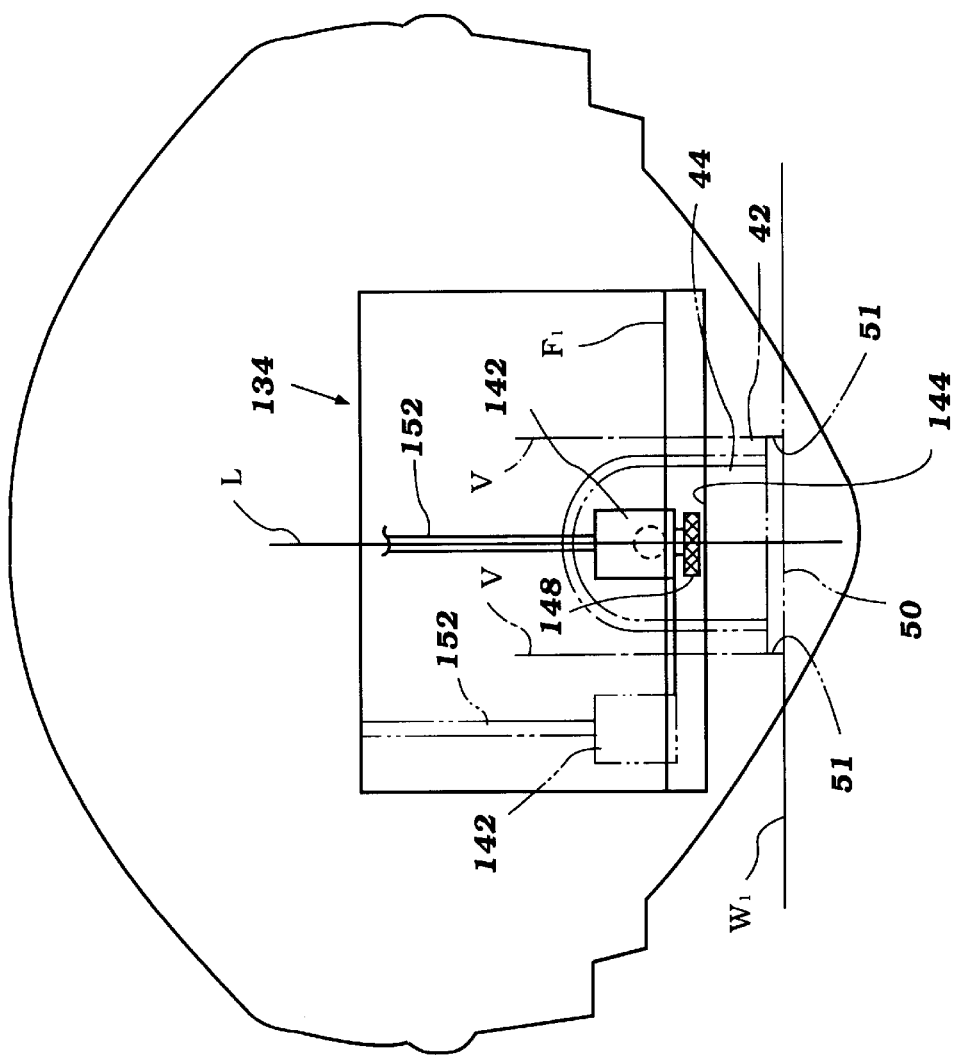
FIG. 3 is a schematic layout of the engine and fuel supply and injection system of FIG. 2 together with an associated control system.
Figure 4:
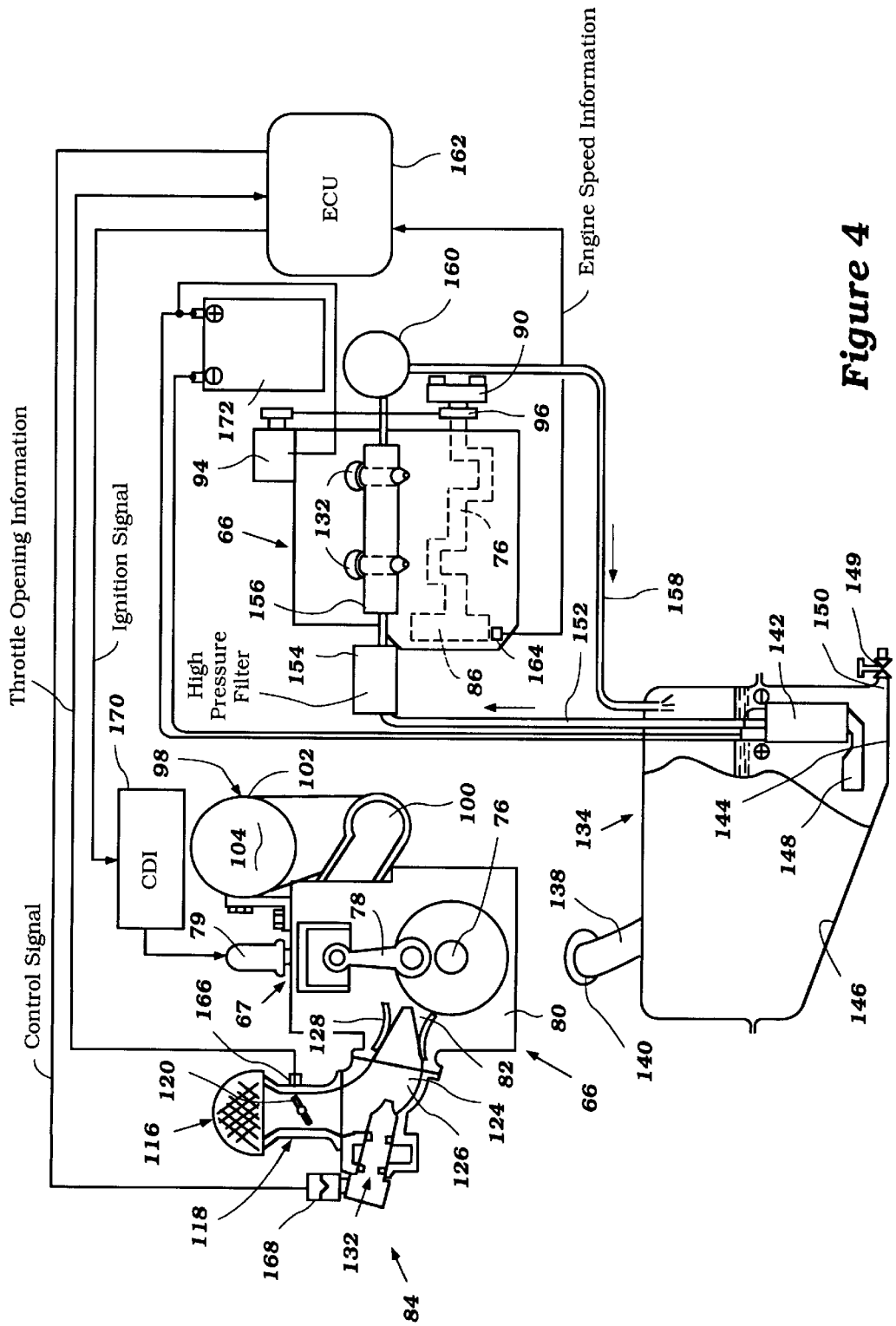
FIG. 4 is a partial top plan view of the engine of FIG. 2 illustrating an oxygen sensor used with the engine.

With reference to FIG. 3, the lower hull 14 is designed such that the watercraft 10 planes or rides on a minimum surface area of the aft end of the lower hull 14 in order to optimize the speed and handling of the watercraft 10 when up on plane. FIG. 3 illustrates the water surface level $W_1$ when the watercraft 10 is planing. For this purpose, the lower hull section generally has a V-shaped configuration formed by a pair of inclined section that extend outwardly from the keel line to outer chines at a dead rise angle. The inclined sections extend longitudinally from the bow toward the transom of the lower hull 14 and as seen in FIG. 4, extend outwardly to side walls of the lower hull. The side walls are generally flat and straight near the stern of the lower hull and smoothly blend towards the longitudinal center of the watercraft at the bow. The lines of intersection between the inclined section and the corresponding side wall form the outer chines of the lower hull section.

As seen in FIGS. 2 and 3, toward the transom of the watercraft, the inclined sections of the lower hull extend outwardly from a recessed channel or tunnel 42 that extends upward toward the upper deck portion 16. The tunnel 42 has a generally parallelepiped shape and opens through the rear of the transom of the watercraft 10, as seen in FIG. 1.

In the illustrated embodiment, a jet pump unit 44 propels the watercraft. The jet pump unit 44 is mounted within the tunnel 42 formed on the underside of the lower hull section 16 by a plurality of bolt 46. An intake duct 48 of the jet pump unit 44 defines an inlet opening 50 that opens into a gullet 52. The inlet opening 50 is defined at least in part between a pair of side edges 51 The inlet opening 50 generally lies at or slightly below the water level $W_1$ when the watercraft is planing, as illustrated in FIG. 3.

The gullet 52 leads to an impeller housing 54 in which the impeller of the jet pump 44 operates. An impeller duct assembly 56, which acts as a pressurization chamber, delivers the water flow from the impeller housing to a discharge nozzle housing 58.

A steering nozzle 60 is supported at the downstream end of the discharge nozzle 58 by a pair of vertically extending pivot pins. In an exemplary embodiment, the steering nozzle 60 has an integral lever on one side that is coupled to the handlebar assembly 28 through, for example, a bowden-wire actuator, as known in the art. In this manner, the operator of the watercraft can move the steering nozzle 58 to effect directional changes of the watercraft 10.

A ride plate 62 covers a portion of the tunnel 42 behind the inlet opening 50 to enclose the pump chambers 54, 56 and the nozzle assembly 58 within the tunnel 42. In this manner, the lower opening of the tunnel 42 is closed to provide a planing surface for the watercraft.

An impeller shaft 64 supports the impeller within the impeller housing 54. The aft end of the impeller shaft 64 is suitably supported and journalled within the compression chamber 56 in a known manner. The impeller shaft 64 extends in the forward direction through a front wall of the tunnel 42. A protective casing surrounds a portion of the impeller shaft 64 that lies forward of the intake gullet 52. In the illustrated embodiment, the protective casing has a tubular shape and is integrally formed with the intake duct 48.

An internal combustion engine 66 of the watercraft powers the impeller shaft 64 to drive the impeller of the jet pump unit 44. The engine 66 is positioned within the engine compartment and is mounted primarily beneath the control mast 20. Vibration-absorbing engine mounts 68 secure the engine 66 to the lower hull portion 14 in a known manner. The engine 66 is mounted in approximately a central position in the watercraft 10.

In the illustrated embodiment, as best seen in FIGS. 2, 4 and 5, the engine 66 includes two in-line cylinders 67 and operates on a two-stroke, crankcase compression principle. The engine 66 is positioned such that the row of cylinders lies parallel to a longitudinal axis of the watercraft 10, running from bow to stern. This engine type, however, is merely exemplary. Those skilled in the art will readily appreciate that the present fuel delivery system can be used with any of a variety of engine types having other numbers of cylinders, having other cylinder arrangements and operating on other combustion principles (e.g., four-stroke principle).

As best seen in FIGS. 4 and 5, a cylinder block 70 and a cylinder head assembly 72 desirably form the cylinders of the engine. A piston 74 reciprocates within each cylinder of the engine 66 and together the pistons 74 drive an output shaft 76, such as a crankshaft, in a known manner. A connecting rod 78 links the corresponding piston 74 to the crankshaft 76. The corresponding cylinder bore, piston and cylinder head of each cylinder forms a variable-volume chamber, which at a minimum volume defines a combustion chamber of the cylinder 67. The cylinder head supports a plurality of spark plug 79. The spark plugs 79 are positioned to locate a gap of one spark plug 79 within each combustion chamber to ignite a fuel charge, as described below.

The crankshaft 76 desirably is journalled within a crankcase, which in the illustrated embodiment is formed between a crankcase member 80 and a lower end of the cylinder block 70. Individual crankcase chambers 82 of the engine are formed within the crankcase by dividing walls and sealing disks, and are sealed from one another with each crankcase chamber communicating with a dedicated variable-volume chamber. Each crankcase chamber 82 also communicates with a charge former of an induction system 84 (which is described below in detail) through a check valve (e.g., a reed-type valve). Because the internal details of the engine 66 desirably are conventional, a further description of the engine construction is not believed necessary to understand and practice the invention.

The output shaft 76 carries a flywheel assembly 86 on a front end of the shaft at a position forward of the row of cylinders. The flywheel assembly 86 includes a flywheel magneto which forms part of a spark timing circuit, as described below. A cover 88 is attached to the front end of the cylinder block 70 and cylinder head 72 to enclose the flywheel assembly 86.

As seen in FIG. 2, a coupling 90 interconnects the engine crankshaft 76 to the impeller shaft 64. A bearing assembly 92, which is secured to the bulkhead, supports the impeller shaft 64 behind the shaft coupling 90.

Figure 6:
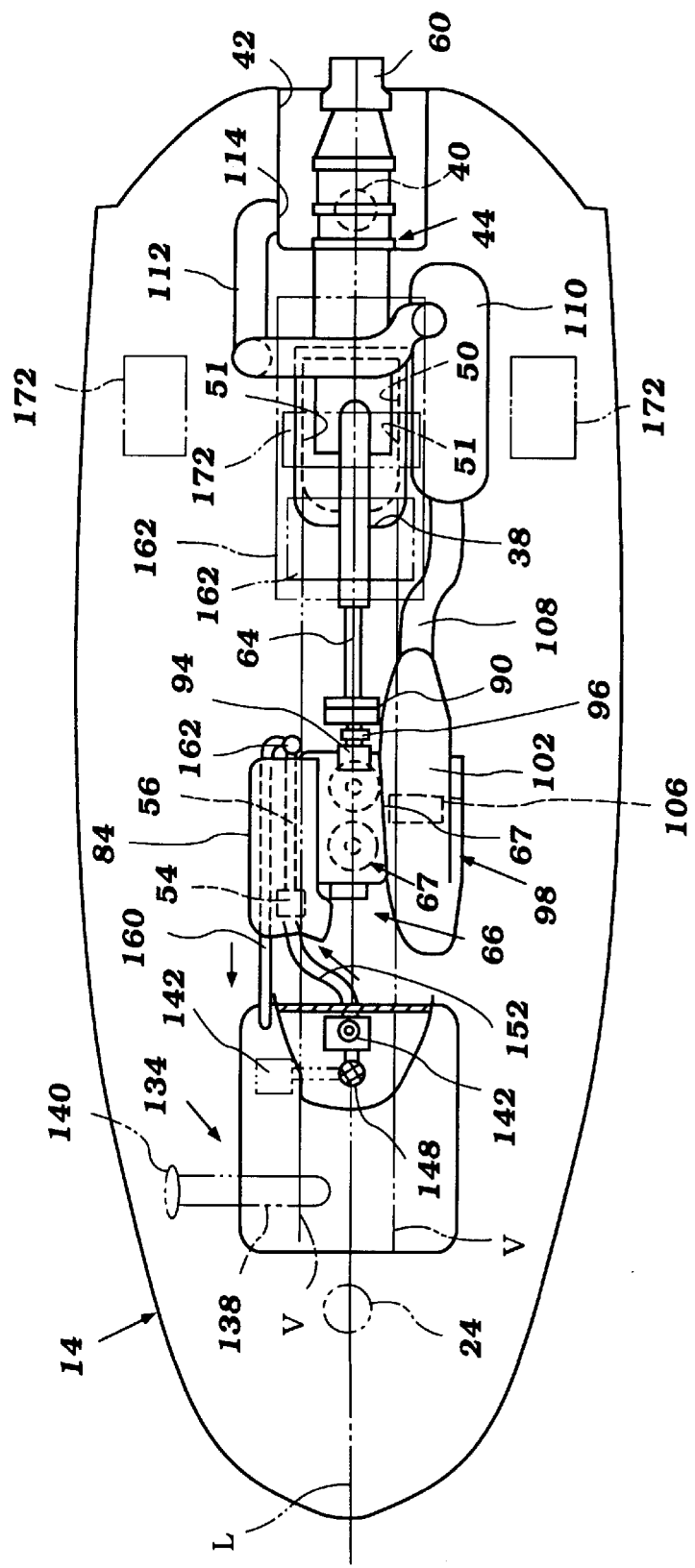
FIG. 6 is a simplified top plan view of the watercraft of FIG. 4 illustrating only select components within the watercraft hull.

As seen in FIG. 6, the output shaft 76 drives a generator 94 (e.g., an alternator) to produce electricity for the watercraft 10. For this purpose, the output shaft 76 carries a drive pulley 96 at a position between the coupling 90 and a rear surface of the engine 66. Alternatively, an intermediate shaft can connect the output shaft to the coupling and carry the drive pulley. The generator 94 is mounted to the cylinder head 72 and includes a pulley coupled to an input shaft of the generator 94. In the illustrated embodiment, the axes of the generator input shaft 76 and the engine output shaft lie in parallel, and the generator pulley lies within the same transverse plane as the drive pulley 96, and desirably lies directly above the drive pulley 96. A belt interconnects together the drive pulley 96 and the generator pulley such that the drive pulley 96 drives the generator pulley, i.e., the pulleys rotate together.

With reference to FIGS. 1, 4 and 5, an exhaust system 98 is provided to discharge exhaust byproducts from the engine 66 to the atmosphere and/or to the body of water in which the watercraft 10 is operated. The exhaust system 98 includes an exhaust manifold 100 that is affixed to the side of the cylinder block 70 and which receives exhaust gases from the variable-volume chambers through exhaust ports in a well-known manner.

An outlet end of the exhaust manifold 100 communicates with a C-shaped pipe section 101. The C-pipe 101 includes an inner tube that communicates directly with the discharge end of the exhaust manifold 100. An outer tube surrounds the inner tube to form a coolant jacket between the inner and outer tubes. Although not illustrated, the C-pipe 101 includes an inlet port positioned near its inlet end. The inlet port communicates with a water jacket of the engine 66.

The outlet end of the C-pipe 101 communicates with an expansion chamber 102. In the illustrated embodiment, the expansion chamber 102 has a tubular shape in which an expansion volume 104 is defined within an annular, thick wall. Coolant jacket passages extend through the expansion chamber wall and communicate with the coolant jacket of the C-pipe 101.

A flexible coupling connects the outlet end of the C-pipe to the inlet end of the expansion chamber 102. The flexible coupling also can includes an outlet port which communicates with an internal coolant passage within the flexible coupling. The coolant passage places the coolant jacket and the coolant passages in communication.

The outlet end of the expansion chamber 102 is fixed to reducer pipe which tapers in diameter toward its outlet. The pipe has a dual shell construction formed by an inner shell which defines an exhaust flow passage. The expansion volume 104 communicates with this passage.

An outer shell is connected to the inner shell and defines a cooling jacket about the inner shell. The coolant jacket passages of the expansion chamber communicate with the coolant jacket of the pipe to discharge a portion of the coolant with the exhaust gases.

A catalyzer 106 can be disposed within the space defined at the mating ends of the expansion chamber and the reducer pipe. For instance, the catalyzer 106 can include an annular shell supporting a honeycomb-type catalyst bed. The catalyst bed is formed of a suitable catalytic material such as that designed to treat and render harmless hydrocarbons, carbon monoxide, and oxides of nitrogen. An annular flange supports the annular shell generally at the center of the flow path through the expansion chamber volume. In this manner, all exhaust gas flowing through the expansion chamber 102 passes through the catalyst bed. The annular flange can be held between outlet end of the expansion chamber and the inlet end of the reducer pipe.

The lower section of the reducer pipe includes a downwardly turned portion that terminates at the discharge end. The inner shell stops short of the outer shell such that the water flow through the water jacket merges with the exhaust gas flow through the exhaust passage at the discharge end.

A flexible pipe 108 is connected to the discharge end of the reducer pipe and extends rearward along one side of the watercraft hull tunnel 42. The flexible conduit 108 connects to an inlet section of a water trap device 110. The water trap device 110 also lies within the watercraft hull 12 on the same side of the tunnel 42.

The water trap device 110 has a sufficient volume to retain water and to preclude the back flow of water to the expansion chamber 102 and the engine 66. Internal baffles within the water trap device 110 help control water flow through the exhaust system.

An exhaust pipe 112 extends from an outlet section of the water trap device 110 and, as best seen in FIG. 6, wraps over the top of the tunnel 42 to a discharge end 114. The discharge end 114 desirably opens into the tunnel 42 at an area that is close to or actually below the water level with the watercraft 10 floating at rest on the body of water.

As seen in FIGS. 2, 4 and 5, the induction system 84 is located on a side of the engine 66 opposite of the exhaust system 98 and supplies a fuel/air charge to the variable-volume chambers. In the illustrated embodiment, the induction system 84 includes an air intake silencer 116. The silencer 116 is located above the engine 66 and includes a plenum chamber.

The plenum chamber of the silencer 116 communicates with a plurality of throttle devices 118. The engine 66 desirably includes a number of throttle devices 118 equal in number to the number of cylinders. In the illustrated embodiment, the throttle devices 118 are throttle valves. A throttle shaft supports a butterfly-type valve plate 120 within a throat 122 of the throttle valve 118.

Each throttle valve 118 communicates with an intake passage 124 of an intake manifold 126. The manifold 126 is attached to the crankcase member 80 and/or cylinder block 70 to place each intake passage 124 in communication with one of the crankcase chambers 82. In the illustrated embodiment, the intake passage 124 desirably has an arcuate shape with a portion of the passage 124 extending generally transverse to a rotational axis of the crankshaft 76 and to a longitudinal axis of the watercraft 10. As a result, the throttle valve 118 and intake silencer 116 are distanced from the cylinder block and cylinder head assemblies 70, 72.

A check valve (e.g., a reed valve) is disposed within each intake passage 124 at the junction between the intake manifold 126 and the crankcase member 80. In the illustrated embodiment, a reed valve assembly 128 includes a pair of reed valves which open upon upward movement to the piston 74 to permit an influx of a fuel/air charge into the corresponding crankcase chamber 82 and close upon downward movement of the piston 74 to inhibit reverse air flow from the chamber 82 into the intake manifold 126.

The engine 66 also desirably includes the same number of charger formers as the number of cylinders. In the illustrated embodiment, the charger formers are fuel injectors 132 which spray fuel into the corresponding intake passage 124; however, the present fuel delivery system can be used with other types of charge formers and arrangements of the charge formers within the engine (e.g., direct injection) as well.

The fuel delivery system supplies fuel to the fuel injectors 132. The fuel delivery system includes a main fuel tank 134 located within the hull 12. In the illustrated embodiment, a plurality of vibration-damping mounts 136 support the fuel tank 134 at a position in front of the engine 66. Any of a variety of known means, such as, for example, straps, can be used to secure the fuel tank 134 to the lower hull portion 14 in this position.

A fuel filler hose 138 extends between a filler cap assembly 140 and the fuel tank 134. In the illustrated embodiment, the filler cap assembly 140 is secured to the bow portion 18 of the hull upper deck 16 to the side and in front of the control mast 20.

In this manner, the fuel tank 134 can be filled from outside the hull 12 with the fuel passing through the fuel filler hose 138 into the fuel tank 134.

The fuel supply system also includes a high pressure fuel pump 142 positioned within a fuel tank. In the illustrated embodiment, the fuel pump 142 is located within the main fuel tank 134; however, it is understood that the features of the present invention can be employed with the fuel pump located within a sub-tank which receives fuel from the main fuel tank. For instance, many aspects of the present invention can be incorporated into a fuel system employing a vapor separator which utilizes a sub-tank for vapor separator. Thus, the following description of the main fuel tank is to be understood as applying equally to applications involving a sub-tank.

The fuel tank 134 desirably includes a depression 144 in which an influent port of the fuel pump 142 is located. In the illustrated embodiment, the depression 144 is formed near the rear of the fuel tank 134 on a bottom surface. Other locations of the depression, however, also are possible. The exemparly depression 134 includes a downwardly sloping front surface 146. The bottom of the depression 144 desirably is sized to accommodate a fuel strainer 148 of the high pressure fuel pump 142.

A fuel cock 149 closes a port 150 which is located at the bottom of the depression 144 on the rear side of the fuel tank 134. The fuel cock 149 provides a means for draining the fuel tank 134 in order to remove any spoiled fuel and water (especially salt water) that may have entered the fuel system. The fuel cock 149 desirably is located below the influent port of the fuel pump 142 and below the strainer 148 in order to drain these components and prevent rust formation.

The high pressure fuel pump 142 supplies fuel to the fuel injectors 132 of the induction system 84. The fuel pump 142 draws fuel from the fuel tank 134 and pushes the fuel through a conduit 152 and a fuel filter 154. After the filter 154, the fuel flows into a fuel rail or manifold 156. The pump 142 delivers fuel under high pressure through the conduit 152 to the fuel rail 156. A check valve (not shown) is disposed within the conduit 152 to prevent a back-flow of fuel from the fuel rail 156.

The fuel rail 156 has an elongated shape. An inlet port of the fuel rail, 156 communicates with the conduit 152 which carries fuel from the high pressure pump 142. The inlet port opens into a manifold chamber which extends along the length of the fuel rail 156.

The fuel rail 156 delivers fuel to each fuel injector 132. For this purpose, the manifold chamber of the fuel rail 156 communicates with the plurality of supply ports defined along the length of the fuel rail 156. Each supply port receives an inlet end of the corresponding fuel injector 132 and communicates with an inlet port of the fuel injector 132 to supply the fuel injector 132 with fuel.

Figure 10:
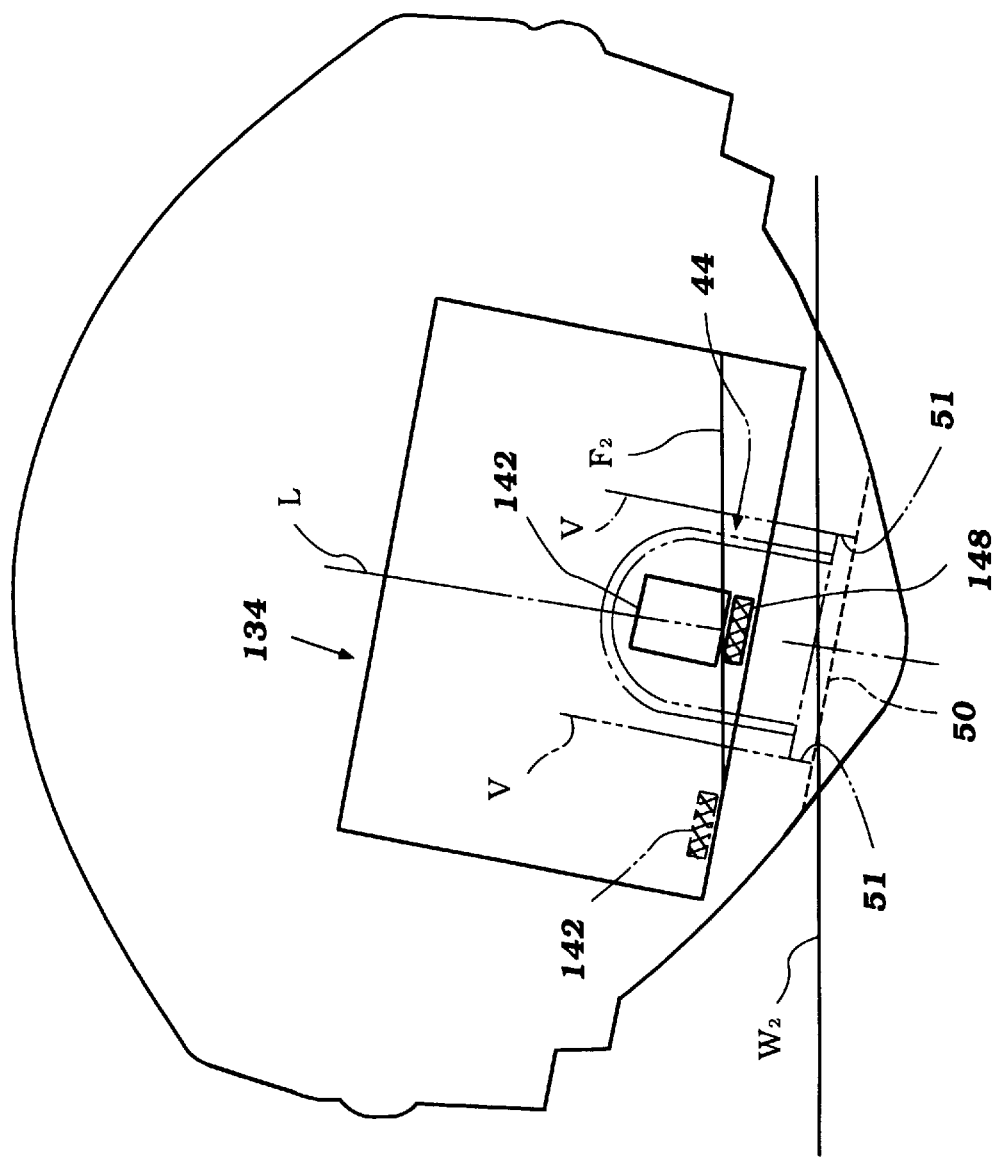
FIG. 10 is a front elevational view of an embodiment of the engine and fuel supply and injection system of FIG. 2 with the watercraft hull shown in outline.

In the illustrated embodiment, the fuel rail 156 lies generally parallel to the direction of travel of the watercraft 10, and also to the longitudinal axis of the watercraft 10 and the rotational axis of the crankshaft 76. Fuel desirably flows through the fuel rail 156 in a direction from bow to stern in order to utilize the momentum of the fuel toward the watercraft's stern to increase the pressure within the fuel rail 156. As a result, a smaller size high pressure pump 142 can be used. The fuel can flow in the opposite direction, i.e., stern to bow, as illustrated in FIG. 10, but this would require a larger size pump. (FIG. 10 illustrates the arrangement of the fuel delivery system to produce a fuel flow through the fuel rail 156 in this reverse direction).

A fuel return line 158 extends between an outlet port of the fuel rail 156 and the fuel bowl 152 of the vapor separator 144. The return line 156 completes the flow loop defined by the high pressure side of the fuel supply system to generally maintain a constant flow of fluid through the fuel rail 156. The constant fuel flow through the high pressure side of the fuel delivery system inhibits heat transfer to the fuel and thus reduces fuel vaporization in the fuel rail 156.

A pressure regulator 160 is positioned within the return line 158. The pressure regulator 160 generally maintains a desired fuel pressure at the injectors (e.g., 50–100 atm). The regulator 160 regulates pressure by dumping excess fuel back to the fuel tank 134, as known in the art.

A control system manages the operation of the engine 66. The control system includes an electronic control unit (ECU) 162 that receives signals from various sensors regarding a variety of engine functions. As schematically illustrated in FIG. 4, a crankcase position sensor 164 senses the angular position of the crankshaft 76 and also the speed of its rotation. The sensor 164 produces a signal(s) which is indicative of angular orientation and speed. Another sensor 166 determines the throttle orientation to determine the opening degree of the throttle valves 118. The sensor 166 produces a signal indicative of the throttle valve position.

The ECU 162 receives these signals from the sensors 164, 166 to control injection timing and duration, as well as spark timing. For this purpose, the ECU 162 communicates with each fuel injector 132, and specifically the solenoid 168 used with each fuel injector 132. The ECU 162 controls the operation of the solenoid 168 in order to manage fuel injection timing and duration, the latter affecting the fuel/air ratio of the produced charge. The desired stoichiometric fuel/air ratio will depend upon the amount of air flow into the engine 66, which is a function of the opening degree of the throttle valve 120. This information is stored within a memory device with which the ECU 162 communicates. The ECU 162 thus processes the information signal received from the throttle valve sensor 166 and determines the amount of fuel to be injected for the sensed operating condition of the engine. The ECU 162 also uses the information from the crankshaft sensor 164 to determine the point during the engine's revolution to initiate fuel injection.

In addition to controlling fuel injection, the ECU 162 also control ignition timing. For this purpose the ECU controls a capacitor discharge ignition unit 170, and the firing of the spark plugs 79. The generator 94 powers one or more charging coil (schematically illustrated as part of the capacitor discharge ignition unit) which increases the voltage of the charge eventually delivered to the spark plugs 79. The generator 79 also charges one or more batteries 172, as known in the art, as well as powers the fuel pump 142.

The capacitor discharge unit 170 desirably controls the discharge of one ignition coil for each spark plug 79. The capacitor discharge ignition unit 170 receives a signal from the ECU 162 which manages the discharge timing.

The engine management system also can include a feedback control system.

Figure 7:
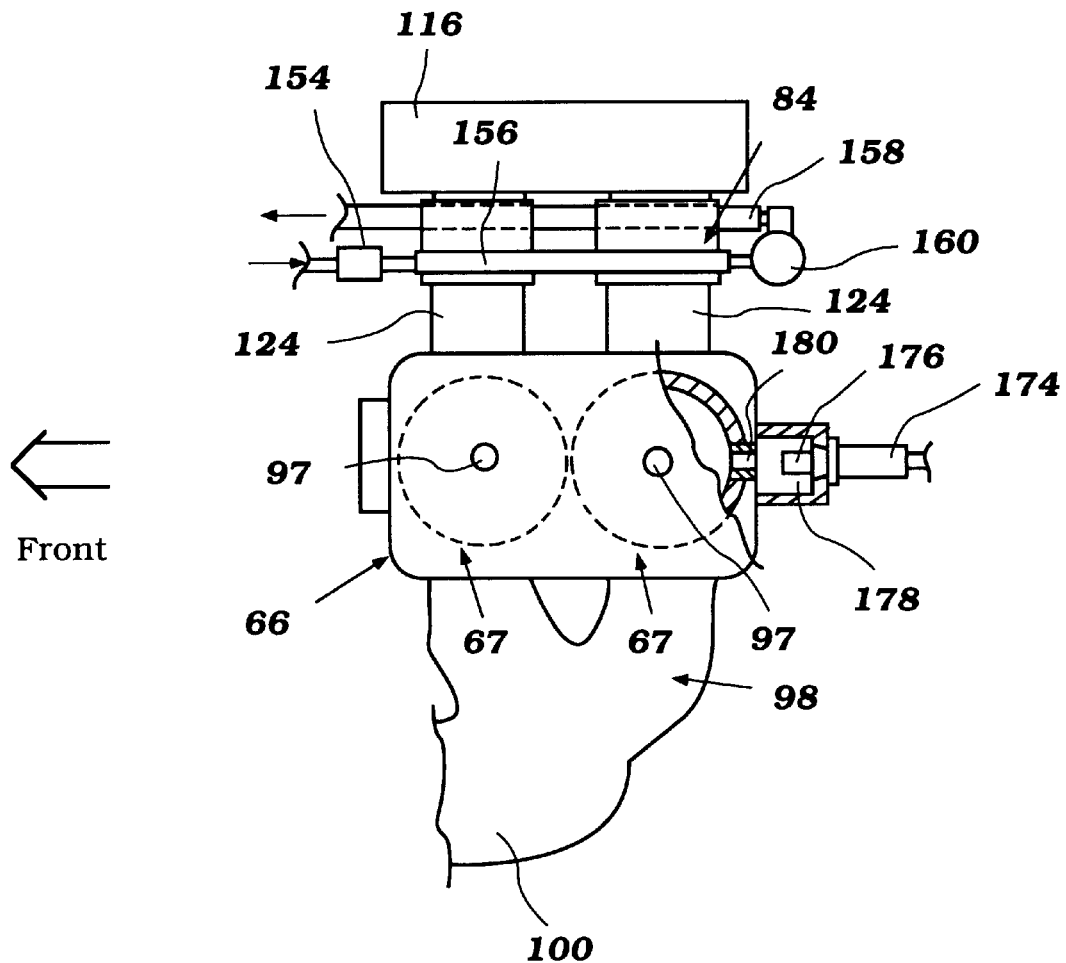
FIG. 7 is a front sectional view of the watercraft of FIG. 2 illustrating the position of a fuel pump inlet relative to a gullet inlet for a propulsion system of the watercraft.

For this purpose, the engine 66 includes an oxygen sensor 174. As seen in FIG. 7, the oxygen sensor 174 has is sensing portion 176 mounted within a collection chamber 178. The collection chamber 178 communicates with at least one of the cylinders through an exhaust gas passage 180, formed either in the cylinder block 70 or the cylinder head 72. The oxygen sensor 174 desirably is mounted either on the front or the rear surface of the engine 66, or on a side of the engine 66 opposite of the side on which the induction system 84 and the exhaust system 98 are attached.

The oxygen sensor 174 produces and sends a signal to the ECU 162 which is indicative of the oxygen content in the exhaust gases. Based upon this information, the ECU 162 adjusts the fuel/air ratio, as known in the art.

The arrangement of the components of the engine 66, engine control system, fuel supply system and exhaust system are best illustrated in FIGS. 2, 3, 6, 8 and 10. The fuel pump 142 desirably is located so as to minimize the amount of air and/or fuel vapor drawn into the pump 142 as the watercraft 10 is maneuvered through the water, especially during low fuel conditions. As seen in FIG. 3, the inlet of the fuel pump 142 and the fuel strainer 148 are positioned to lie between a pair of vertical extension planes V in which the side edges 51 of the gullet inlet opening 50 lie. The fuel pump inlet and fuel strainer 148 desirably lie along the longitudinal center plane L of the watercraft. The delivery pipe 152 also extends in a direction generally parallel to a vertical center plane L. In this position, the pump 142 draws less air than at other location within the fuel tank 134.

For instance, even under low fuel condition, with a fuel level $F_1$, the pump inlet and fuel strainer 148 lie below the fuel level $F_1$ in the tank 134. This is the condition illustrated in FIG. 3. And when the watercraft is leaned to one side, the pump inlet and fuel strainer 148 remain submerged within the fuel. This would not be the case, however, if the strainer 148 were located in an off center position, outside the vertical extension planes V, as illustrated in phantom in FIG. 10. The pump 142 under these conditions would draw air and fuel vapors into the fuel line because the strainer 148 would lie above the fuel level $F_2$. The central position of the fuel pump 142 thus inhibits vapor influx into the fuel delivery line 152 and fuel rail 156, even when the fuel level in the tank 134 is low.

As best seen in FIG. 6, the fuel pump 142 desirably lies in front of the engine 66 and between the air ducts 24, 40. In this position, the air flow between the ducts cools the fuel and the fuel pump 14. As a result, the fuel pump 142 runs cooler and the durability and life-span of the pump 142 tends to increase.

In the illustrated embodiment, the air ducts 24, 40 are positioned to lie on a longitudinal center line L of the watercraft hull 10. The output shaft 76 of the engine 66, as well as the row of cylinders also lie on the longitudinal center line L for watercraft balance.

As seen in FIG. 3, the position of the front air duct 24 can lie either forward or reward of the main fuel tank 134. For ventilation purposes, however, the air duct 24 desirably lies in front of the fuel tank 134.

As seen in FIGS. 1 and 3, the battery 172 and the ECU 162 desirably lie beneath the access opening 38 for easy access by a technician. In this location, the battery 172 also lies within the air stream between the air ducts 24, 40 for ventilation purposes. In the alternative, the watercraft 10 can include two batteries 172 which are located on opposite sides of the watercraft center line L for good balance with the access opening 38 positioned between the batteries 172 for easy access.

Figure 8:
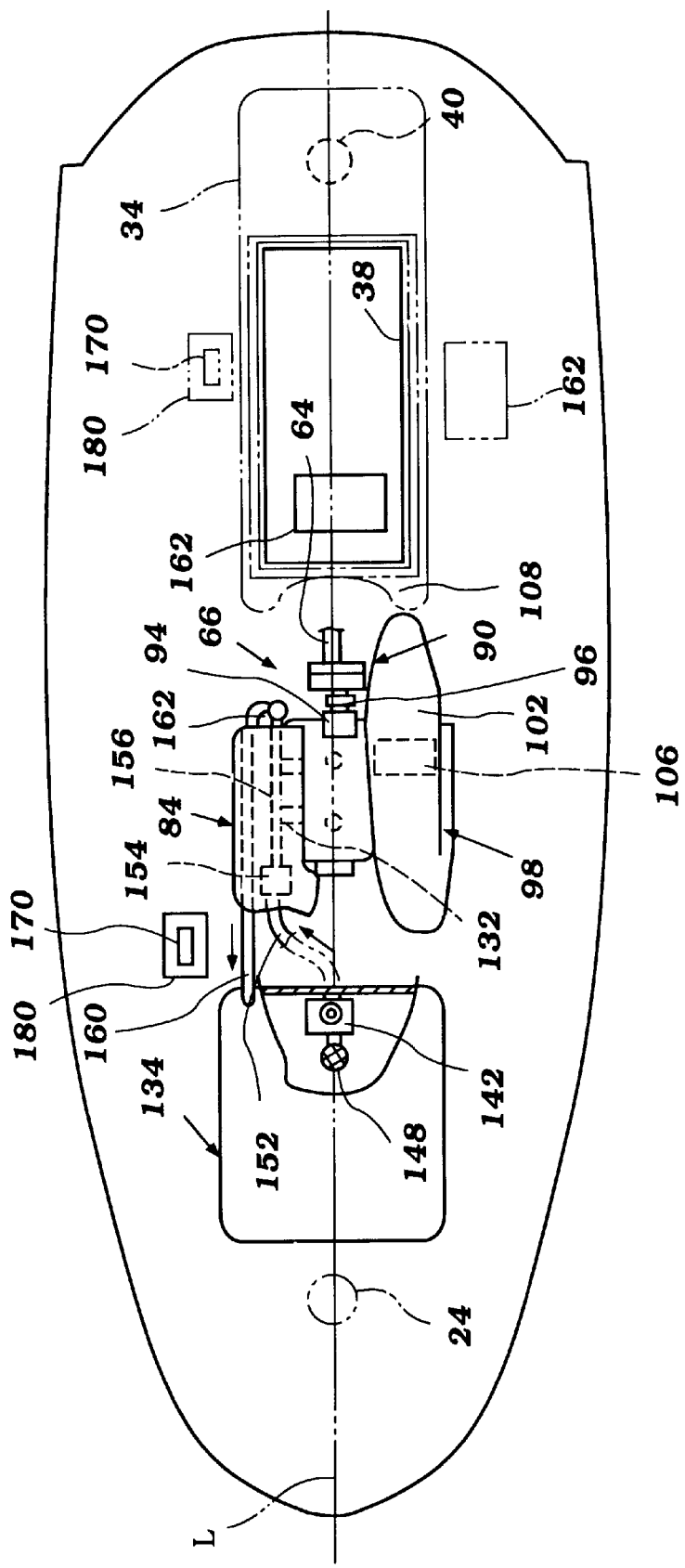
FIG. 8 is a front sectional view of the watercraft, similar to the view illustrated in FIG. 6, but with the watercraft leaned to its port side.
Figure 9:
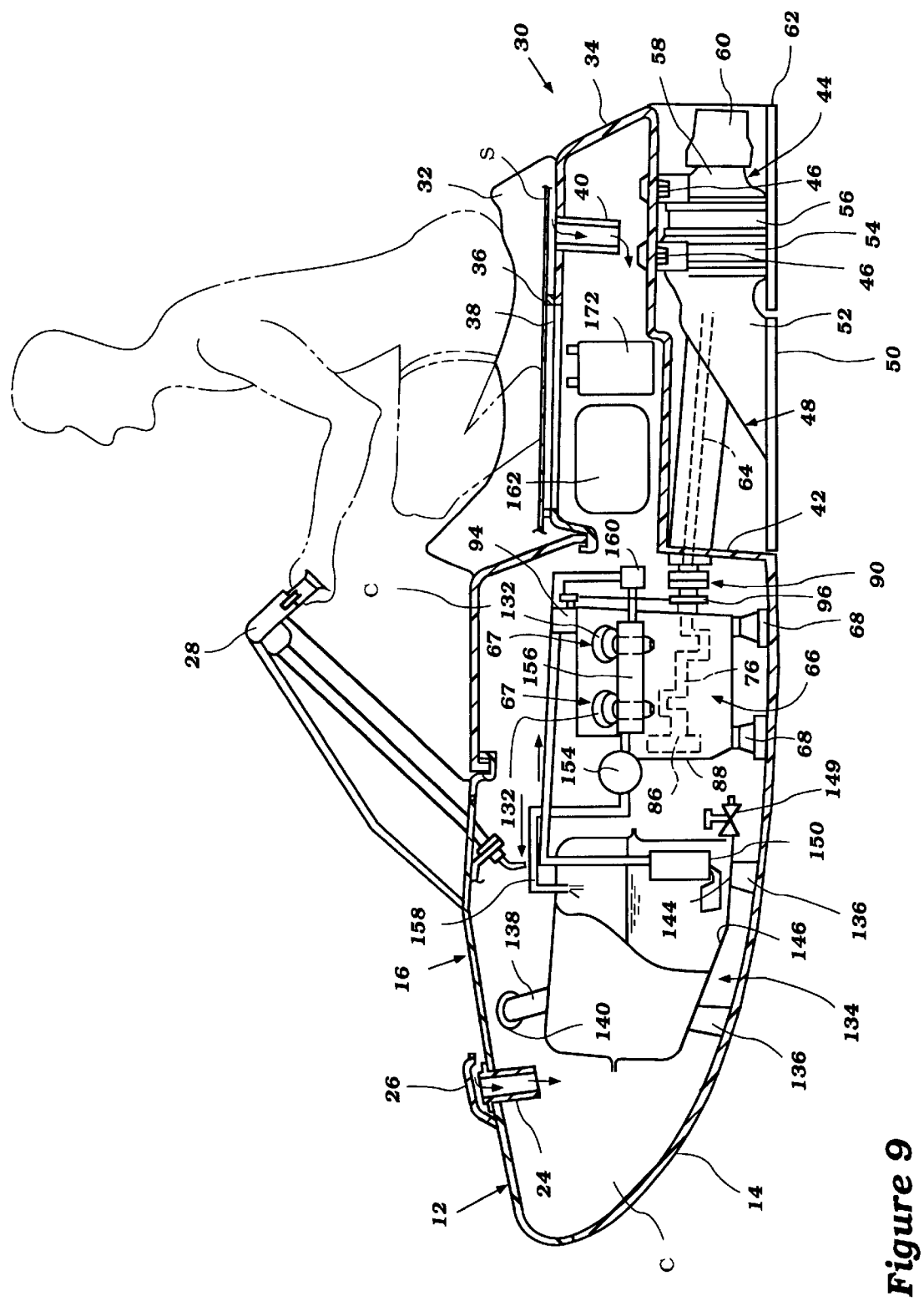
FIG. 9 is a side sectional view of the watercraft of FIG. 2, but with an another arrangement of the fuel supply and injection system.

As seen in FIG. 8, the ECU 162 desirably is remotely located relative to the charging coil 170. In one position, the ECU 162 is located behind the engine 66 and beneath the access opening 38 and the seat 32, while the charging coil 170 and its enclosure 180 are located in front and to the side of the engine 66. Alternatively, the ECU 162 is located on a side of the watercraft center line L opposite of the charging coil 170 and enclosure 180. In this position the access opening 38 is located between the ECU 162 and charging coil 170. Either of these location reduce signal noise experienced by the ECU 162 which the high-voltage charging coil tends to produce. In both of these positions, the ECU 162 also lies between the air ducts 24, 40, within the produced air cross-stream, which cools the ECU 162.

FIGS. 11 through 14 illustrate various arrangement of the fuel supply system within the engine compartment, as well as several engine configurations which help isolate the fuel lines from the heat damage. Because of the similarity of components between the following embodiments and the above-described embodiment, like reference numerals are used to ease the reader's understanding.

Figure 11:
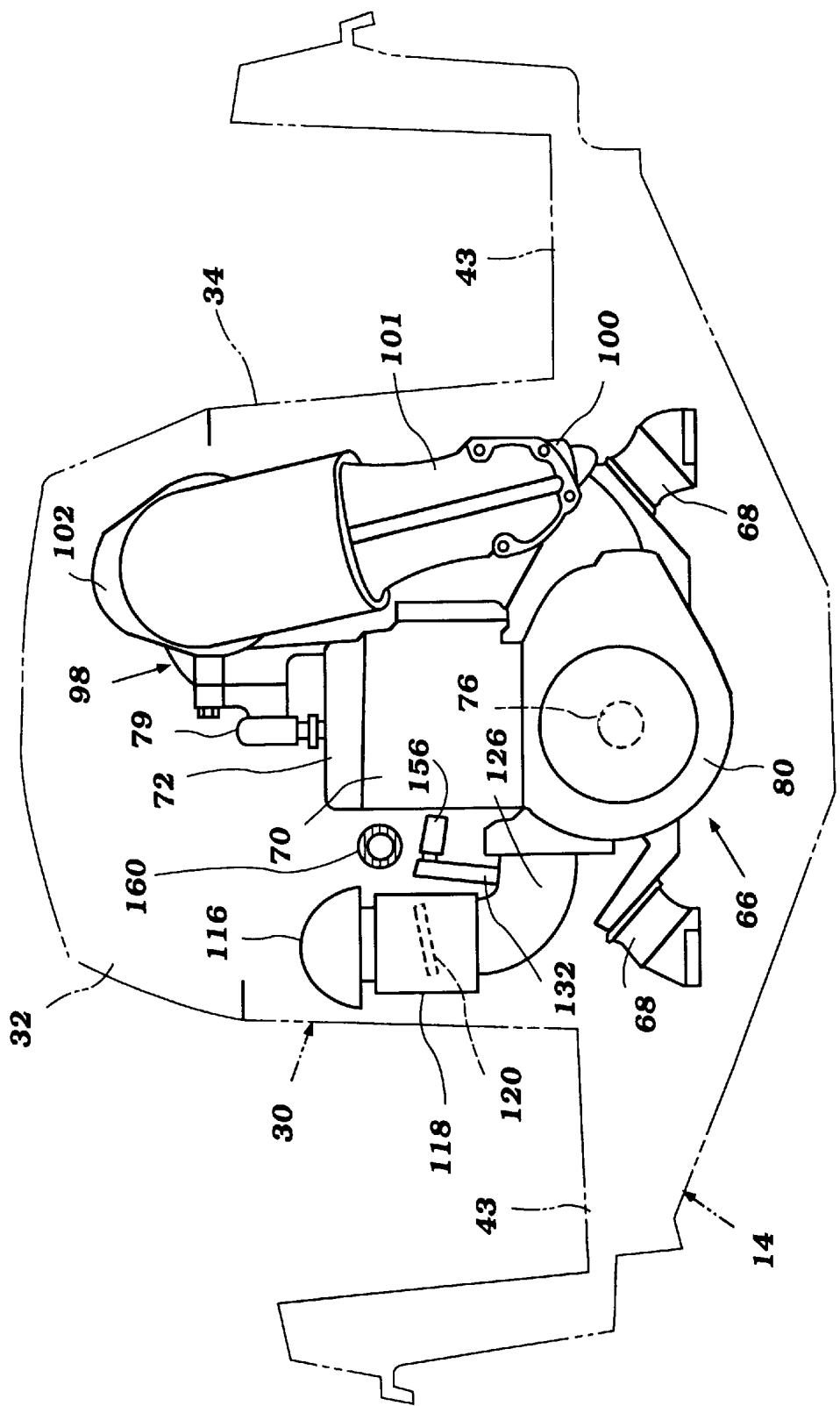
FIG. 11 is a front elevational view of an another embodiment of the engine and fuel supply and injection system of FIG. 2 with the watercraft hull shown in outline.

FIG. 11 illustrates an engine 66 which is configured in accordance with the above description. In this embodiment, the fuel system is arranged such that both the fuel rail 156 and the return line 158 are positioned within the space between the throttle devices 118 and the cylinder block 70, above the transverse section of the intake passages 126. In this position, the fuel lines 156, 158 lie within the air flow stream between the ducts 24, 40 and the air stream into the intake silencer 116. The air flow over the fuel lines 156, 158 cools the fuel and reduces indecencies of fuel vaporization within the lines 156, 158.

Figure 12:
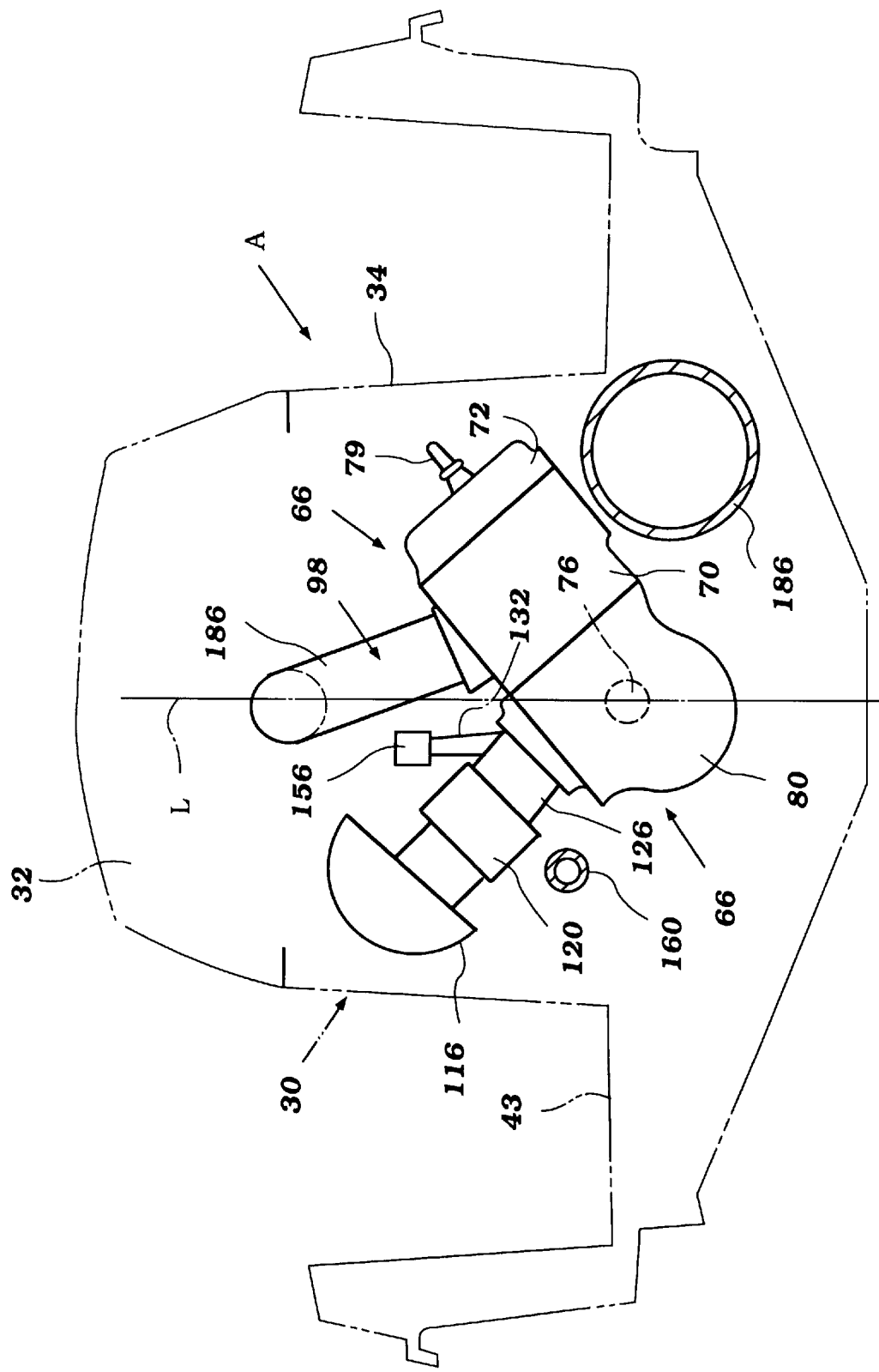
FIG. 12 is a front elevational view of a further embodiment of the engine and fuel supply and injection system of FIG. 2 with the watercraft hull shown in outline.
Figure 13:
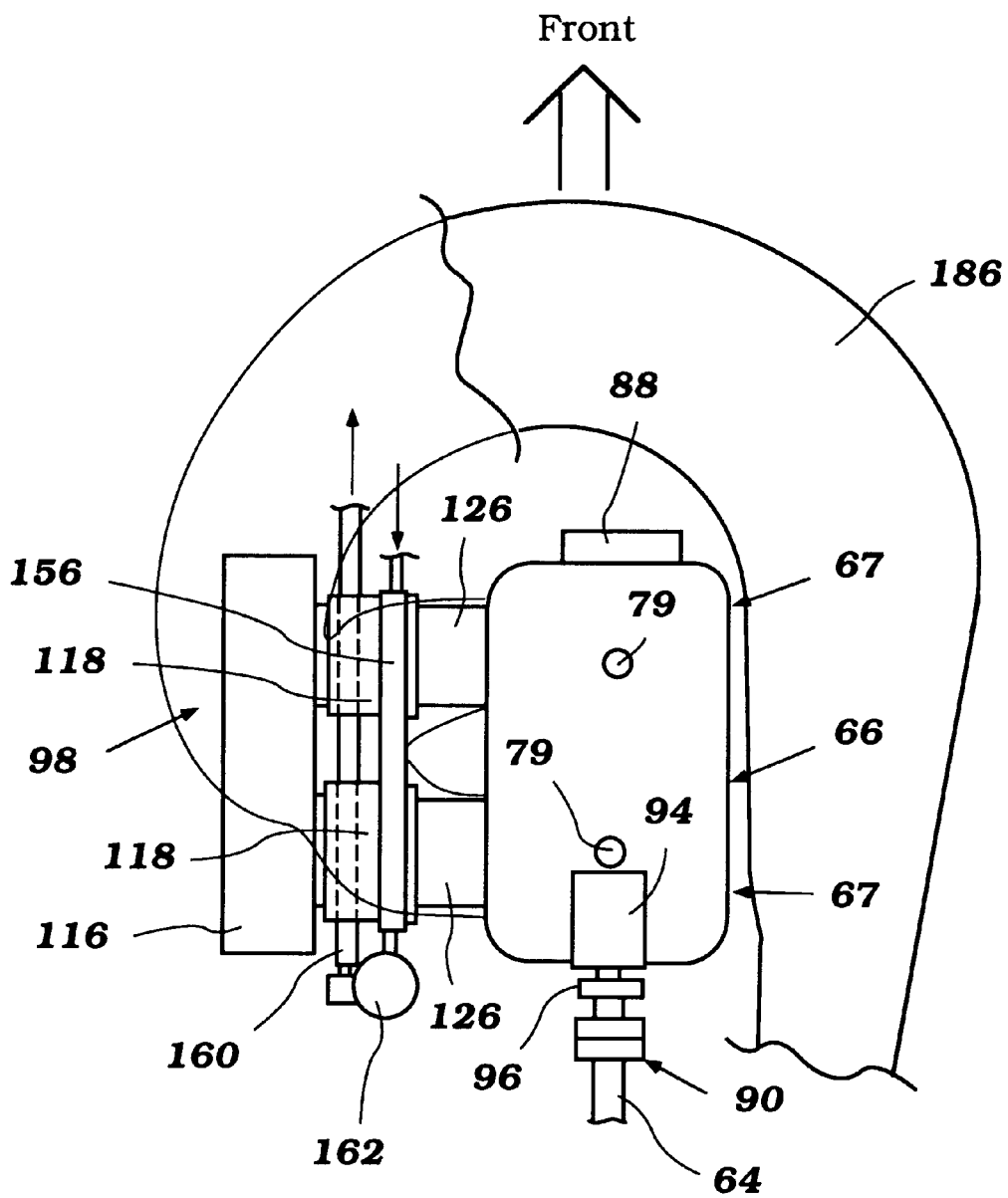
FIG. 13 is an upper plan view of the engine of FIG. 12 as view in the direction of arrow A.

FIGS. 12 and 13 illustrate an alternative engine arrangement in which the cylinders 67 are inclined to one side of the longitudinal center plane L. The engine 66 however, desirably is arranged within the engine compartment so that its output shaft 76 rotates about an axis that lies within the plane L. The intake passages 126 lies on a side of the central plane L opposite of the cylinders 67. An exhaust pipe 186 of the exhaust system 98 is connected to a side of the cylinder block 70 closest to the central plane L. As best seen in FIG. 13, the exhaust pipe 186 wraps around the front of the cylinder block 70 and then extends along the lower side of the cylinders 67 toward the water trap device 110, which is positioned behind the engine 66.

The fuel rail 156 and the fuel injectors 132 are arranged between the induction system 84 and the cylinder block 70, near the central plane L. In the illustrated embodiment, the fuel rail 156 and the fuel injectors 132 lie partially below the exhaust pipe 186 with the fuel injectors 132 communicating with the intake passages 124 of the intake manifold 126. It is understood, however, that the fuel injectors 132 could alternatively be arranged to inject fuel directly into the combustion chambers of the cylinders 67 or into scavenge passages of the cylinders 67, while lying within the valley formed between the induction system 84 and the cylinder block 70.

In the illustrated embodiment, the fuel return line 158 extends on an opposite side of the induction system 84 from the side on which the exhaust pipe 186 is located. In this position, the return line 158 lies away from the heat emitted by the exhaust pipe 186; however, the return line 158 also lies generally outside of the air stream between the ducts 24, 40, as well as the air stream into the intake silencer 116.

Figure 14:
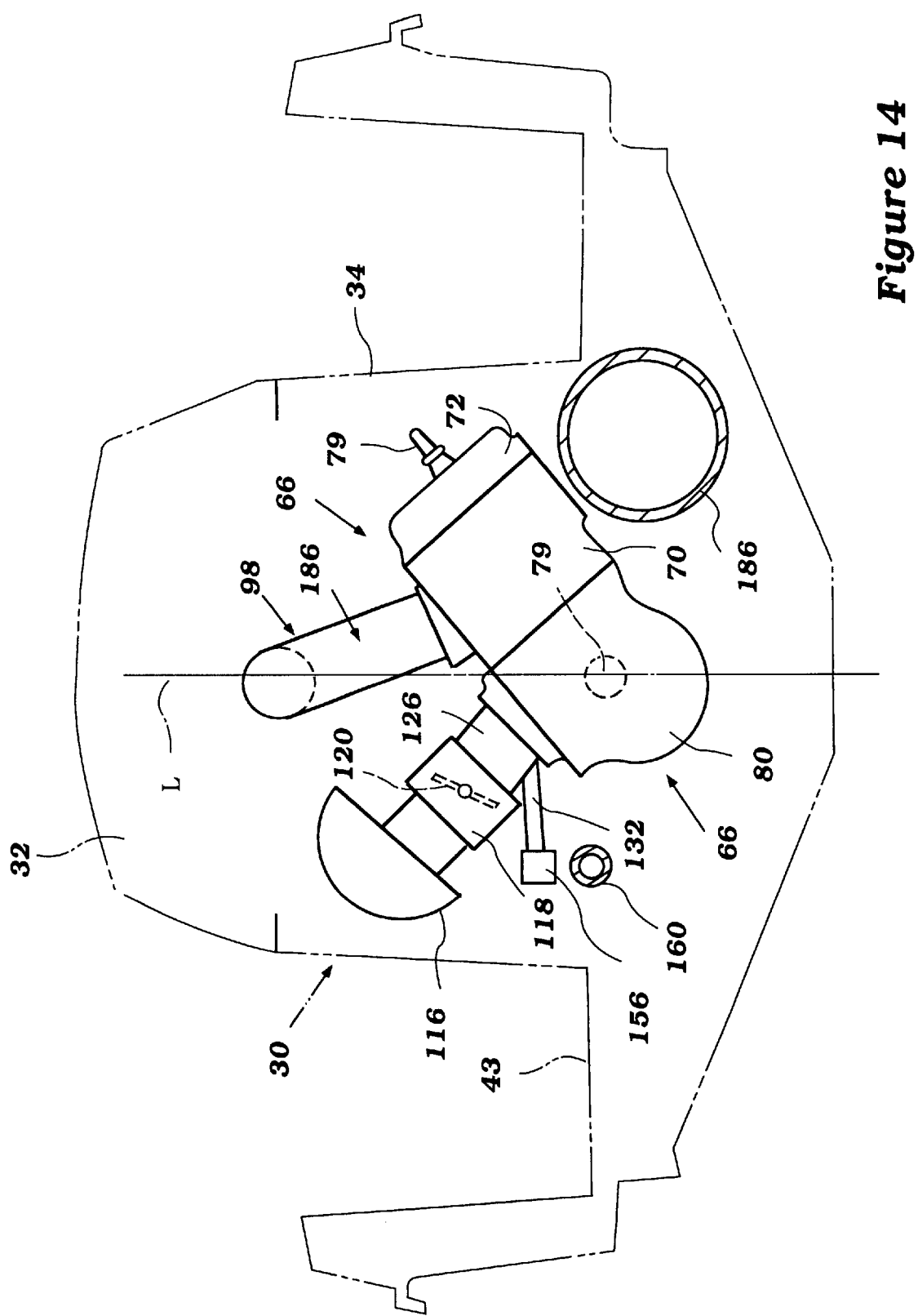
FIG. 14 is a front elevational view of an additional embodiment of the engine and fuel supply and injection system of FIG. 2 with the watercraft hull shown in outline.

FIG. 14 illustrates an engine configured similarly to that described in connection with FIGS. 12 and 13. In this embodiment, the fuel rail 156 and the fuel return line 158 are arranged to lie on a side of the intake passages 124 opposite of the side on which the exhaust pipe 186 lies. In this position, the fuel lines 156, 158 are remotely located relative to the exhaust pipe 186 in order to remove the lines 156, 158 from the heat effects produced by the exhaust pipe 186.

As common with all of the embodiments described above, the fuel delivery system is arranged in the engine compartment in a manner reducing the heat effects on the fuel lines, on the fuel within the line, and on the fuel pump. As a result, the consistency of the fuel/air ratio of the produced fuel charge is increased as less fuel is vaporized within the lines, and the durability of the fuel pump is improved.

Although this invention has been described in terms of certain preferred embodiments, other embodiments apparent to those of ordinary skill in the art are also within the scope of this invention. Accordingly, the scope of the invention is intended to be defined only by the claims that follow.

What is claimed is:

1. A small watercraft having a hull defining a rider's area behind a bow of the hull which is sized to accommodate at least one rider, an internal combustion engine located within the hull and driving a propulsion device which is carried by the hull, and a fuel supply system including a fuel tank communicating with a fuel supply loop which extends between the engine, and a fuel pump positioned within the fuel supply loop to circulate fuel through the supply loop, the fuel pump being located within the fuel tank, the fuel loop of said fuel supply system including a fuel rail that communicates with a plurality of fuel injectors of the engine, and the fuel rail being positioned to lie generally parallel to a rotational axis of an output shaft of the engine.

2. A small watercraft as in claim 1, wherein the fuel tank is located in front of the engine, toward the bow of the hull.

3. A small watercraft as in claim 1 additionally comprising a fuel filler hose communicating with the fuel tank and with a fuel cap assembly located on an exterior surface of the watercraft hull.

4. A small watercraft as in claim 1, wherein said hull defines a tunnel on the underside of the hull, and the propulsion device is a jet pump unit mounted in the tunnel, the jet pump unit including an intake duct with a water inlet opening defined between a port side edge and a starboard side edge, and the fuel pump being located in front of the tunnel and between a pair of extension lines that project from the sides of the water inlet opening.

5. A small watercraft as in claim 1 additionally comprising first and second air ducts formed in the hull, and an inlet to the fuel pump being located within the hull at a position between the air ducts.

6. A small watercraft as in claim 1, wherein said fuel pump includes an electric motor located within the fuel tank.

7. A small watercraft as in claim 6 additionally comprising a pair of batteries, the batteries being located on opposites of a longitudinal center line of the hull, and at least one of the batteries being in electrical connection with the motor of the fuel pump.

8. A small watercraft as in claim 6, wherein the engine includes an alternator which supplies electricity to the motor of the fuel pump.

9. A small watercraft as in claim 8, wherein an output shaft of the engine drives the alternator through a drive mechanism, and the drive mechanism is coupled to the output shaft at a point between a rear surface of the engine and a coupling that interconnects the output shaft to an impeller shaft of the propulsion device.

10. A small watercraft as in claim 1, wherein the fuel pump is arranged in the fuel supply loop to produce a flow of fuel through the fuel rail in a direction toward an aft end of the watercraft hull.

11. A small watercraft as in claim 1 further comprising a fuel supply tank that defines a first volume, and the fuel tank defines a second volume that is less than the first volume.

12. A small watercraft having a hull defining a rider's area behind a bow of the hull which is sized to accommodate at least one rider, an internal combustion engine located within the hull and driving propulsion device which is carried by the hull, and a fuel supply system including a fuel tank communicating with a fuel supply loop which extends between the engine, and a fuel pump positioned within the fuel supply loop to circulate fuel through the supply loop, the fuel pump being located within the fuel tank and including an inlet port positioned in a depression formed in the fuel tank.

13. A small watercraft as in claim 12, wherein said depression is located at the bottom of the fuel tank.

14. A small watercraft as in claim 13, wherein said depression slopes downward to the rear of the fuel tank.

15. A small watercraft having a hull defining a rider's area behind a bow of the hull which is sized to accommodate at least one rider, an internal combustion engine located within the hull and driving a propulsion device which is carried by the hull, and a fuel supply system including a fuel tank communicating with a fuel supply loop which extends between the engine, and a fuel pump positioned within the fuel supply loop to circulate fuel through the supply loop, the fuel pump being located within the fuel tank, the fuel tank including a drain plug, and the inlet to the fuel pump being located above the drain plug.

16. A small watercraft having a hull defining a rider's area behind a bow of the hull which is sized to accommodate at least one rider, an internal combustion engine located within the hull and driving a propulsion device which is carried by the hull, and a fuel supply system including a fuel tank communicating with a fuel supply loop which extends between the engine, and a fuel pump positioned within the fuel supply loop to circulate fuel through the supply loop, the engine including a magneto-flywheel assembly and said fuel pump being located in front of the magneto-flywheel assembly.

17. A small watercraft as in claim 16, wherein the fuel pump is intersected by a longitudinal plane which substantially bisects the watercraft.

18. A small watercraft as in claim 16 further comprising a fuel supply tank that defines a first volume, and the fuel tank defines a second volume that is less than the first volume.

19. A small watercraft having a hull defining a rider's area behind a bow of the hull which is sized to accommodate at least one rider, an internal combustion engine located within the hull and driving a propulsion device which is carried by the hull, an exhaust pipe connected to the engine, and a fuel supply system including a fuel delivery line and a fuel return line that together define a fuel loop between the engine and a fuel tank the fuel delivery line communicating with a plurality of fuel injectors, said fuel delivery and return lines being arranged within the hull of the watercraft such that not more than one of said lines extends next to any portion of the exhaust pipe, and a portion of said fuel delivery line extending next to a portion of the exhaust pipe.

20. A small watercraft having a hull defining a rider's area behind a bow of the hull which is sized to accommodate at least one rider, an internal combustion engine located within the hull and driving a propulsion device which is carried by the hull, an exhaust pipe connected to the engine, and a fuel supply system including a fuel delivery line and a fuel return line that together define a fuel loop between the engine and a fuel tank, the fuel delivery line communicating with a plurality of fuel injectors said fuel delivery and return lines being arranged within the hull of the watercraft such that not more than one of said lines extends next to any portion of the exhaust pipe, said engine including an output shaft which rotates about an axis in a crankcase of the engine, the crankcase being divided into a plurality of crankcase chambers, and an induction system of the engine communicating with each crankcase chamber and being located to one side of a vertical plane that passes through the axis of the output shaft.

21. A small watercraft as in claim 20, wherein at least a portion of the induction system extends in a direction away from the vertical plane.

22. A small watercraft as in claim 21, wherein the induction system lies between the vertical plane and the fuel delivery line.

23. A small watercraft as in claim 21, wherein the fuel delivery line lies in a space between the vertical plane and the induction system.

24. A small watercraft as in claim 23, wherein the exhaust pipe lies on a side of the vertical plane opposite of the fuel delivery line.

25. A small watercraft as in claim 20, wherein the engine includes a plurality of inclined cylinders, and each cylinder is leaned to a side of the vertical plane opposite the side on which the induction system lies.

26. A small watercraft as in claim 25, wherein the fuel delivery line lies between the inclined cylinders and the induction system.

27. A small watercraft as in claim 26, wherein a portion of the exhaust pipe lies within the space between the inclined cylinders and the induction system, and the fuel delivery line lies within a space defined between the induction system, the portion of the exhaust pipe and the inclined cylinders.

28. A small watercraft as in claim 25, wherein the induction system lies between the fuel delivery line and the inclined cylinders.

29. A small watercraft as in claim 20, wherein the induction system lies between the fuel return line and the vertical plane.

30. A small watercraft as in claim 20 further comprising a combustion chamber, wherein at least one of the plurality of fuel injectors injects fuel directly into the combustion chamber.

31. A small watercraft as in claim 21, wherein at least one of the plurality of fuel injectors injects fuel into the induction system.

32. A small watercraft as in claim 20 further comprising a fuel supply tank that defines a first volume, and the fuel tank defines a second volume that is less that the first volume.

33. A small watercraft having a hull defining a rider's area behind a bow of the hull which is sized to accommodate at least one rider, an internal combustion engine located within the hull and driving a propulsion device which is carried by the hull, an exhaust pipe connected to the engine, and a fuel supply system including a fuel delivery line and a fuel return line that together define a fuel loop between the engine and a fuel tank, the fuel delivery line communicating with a plurality of fuel injectors, said fuel delivery and return lines being arranged within the hull of the watercraft such that not more than one of said lines extends next to any portion of the exhaust pipe, additionally comprising an oxygen sensor communicating with at least one cylinder of the engine.

34. A small watercraft as in claim 33, wherein a sensor end of the oxygen sensor is mounted in a collection chamber which communicates with at least one of the cylinders of the engine through a collection passage.

35. A small watercraft as in 33, wherein the induction system and the exhaust pipe are each connected to one of the sides of a cylinder block assembly of the engine and the oxygen sensor is connected to the cylinder block assembly on either the front or rear ends of the cylinder block assembly.

36. A small watercraft as in claim 33, wherein the induction system and exhaust pipe are connected to a cylinder block assembly on the same side of the cylinder block assembly, and the oxygen sensor is connected to the cylinder block assembly on any of the other sides and ends of the cylinder block assembly.

37. A small watercraft having a hull defining a rider's area behind a bow of the hull which is sized to accommodate at least one rider, the hull having a longitudinal axis and defining an engine compartment, a fuel-injected, internal combustion, multi-cylinder engine located within the hull engine compartment and driving a propulsion device which is carried by the hull, the engine having a plurality of fuel injectors to produce a fuel charge within the engine cylinders, a plurality of spark plugs which ignite the fuel charge within the engine cylinders, and an electronic control unit that communicates with the fuel injectors to control injection timing and volume and that operates an ignition coil, which is connected to the spark plugs, to control spark timing, the electronic control unit being mounted to the hull at a remote location relative to the ignition coil.

38. A small watercraft as in claim 37, wherein one of the electronic control unit and the ignition coil lies toward a bow of the watercraft hull and the other of the electronic control unit and the ignition coil lies toward a stem of the watercraft hull.

39. A small watercraft as in claim 37, wherein one of the electronic control unit and the ignition coil lies on one side of the hull longitudinal axis and the other one of the electronic control unit and the ignition coil lies on the other side of the hull longitudinal axis.

40. A small watercraft as in claim 37, wherein the riders area of the hull includes a seat having an access opening into the engine compartment positioned beneath the seat, and the electronic control unit being located within the engine compartment at a position below the access opening.

41. A small watercraft as in claim 37, wherein the hull includes at least two air ducts that communicate with the engine compartment, and the electronic control unit is located between the air ducts.

42. A small watercraft having a hull defining a rider's area behind a bow of the hull which is sized to accommodate at least one rider, an internal combustion engine located within an engine compartment formed within the hull and driving a propulsion device which is carried by the hull, a pair of air ducts communicating with the engine compartment and located on opposite sides of the engine, an exhaust pipe connected to the engine, and a fuel supply system including a fuel delivery line and a fuel return line that together define a fuel loop between the engine and a fuel tank, the fuel delivery line communicating with a plurality of fuel injectors, said fuel delivery and return lines being arranged within the hull of the watercraft such that at least one of said lines extends between the air ducts.

43. A small watercraft as in claim 42, wherein said engine includes an output shaft which rotates about an axis in a crankcase of the engine, the crankcase is divided into a plurality of crankcase chambers, and an induction system of the engine communicates with each crankcase chamber and is located to one side of a vertical plane that passes through the axis of the output shaft.

44. A small watercraft as in claim 42, wherein at least a portion of the induction system extends in a direction away from the vertical plane.

* * * * *

UNITED STATES PATENT AND TRADEMARK OFFICE
CERTIFICATE OF CORRECTION

PATENT NO. : 5,902,158
DATED : May 11, 1999
INVENTOR(S) : Ryoichi Nakase et al.

It is certified that error appears in the above-identified patent and that said Letters Patent is hereby corrected as shown below:

Claim 38, column 16, line 6, "a stem of" should be -- a stern of --.

Signed and Sealed this

Eleventh Day of January, 2000

Attest:

Q. TODD DICKINSON

*Attesting Officer*     *Acting Commissioner of Patents and Trademarks*